Feb. 14, 1950 L. F. POLK 2,497,236
SIZE GAUGING DEVICE
Filed June 8, 1944

INVENTOR.
Louis F. Polk
BY Edward T. Norris
ATTORNEY.

Patented Feb. 14, 1950

2,497,236

UNITED STATES PATENT OFFICE 2,497,236

SIZE GAUGING DEVICE

Louis F. Polk, Dayton, Ohio, assignor to The Sheffield Corporation, Dayton, Ohio, a corporation of Ohio Application June 8, 1944, Serial No. 539,273

1 Claim. (Cl. 73—37.5)

This invention relates to gauges for measuring the size of a workpiece or comparing it with a part of standard size.

One object of the invention is the provision of a gauging member adapted for use in conjunction with a flow measuring instrument, the gauging member having fixed arms extending in diverging relationship and arranged to locate the workpiece and the gauging member with respect to one another and with respect to a gauging nozzle through which a flow of fluid takes place. The gauging member is applied to the workpiece in a direction transverse of the work axis so that there is substantially no friction or rubbing action on the accurately made parts of the gauging member.

Another object is the provision of a gauging member which is entirely devoid of moving parts, adapted for connection to a flow measuring instrument, and employing a fluid discharge nozzle arranged between angularly related work engaging faces, these two faces of the gauging member serving as the sole locating surfaces for the workpiece.

Other objects and advantages of the invention will be apparent from the following description, the appended claim and the accompanying drawing, in which, Fig. 1 is a perspective view of a gauging device embodying the present invention;

Figure 1:
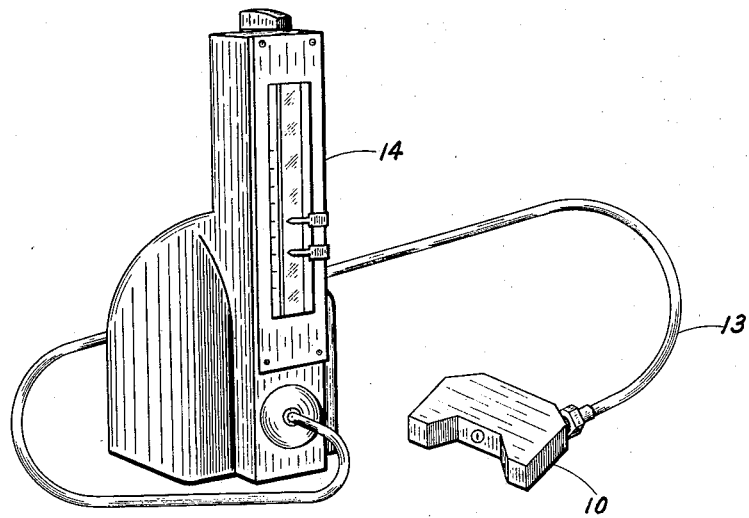
Figure 2:
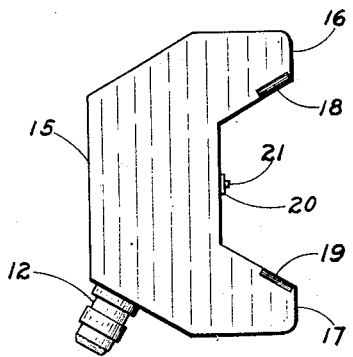
Fig. 2 is a side elevation of the gauging member.

Referring more particularly to the drawing in which the preferred form of the invention has been illustrated, 10 designates a gauging member adapted for application to a workpiece indicated at 11. The gauging member is shown with a fluid supply connection or stem 12 by means of which it is connected to a flexible tube 13. The latter extends to a flow measuring instrument 14. Any suitable flow measuring instrument may be used but, as herein shown, this instrument measures changes in the rate of air flow supplied from the instrument at a controlled pressure and passing through the flexible tube 13, discharging through a leakage path controlled by or constituted in part by the workpiece surface. Such an instrument has been more fully described in U. S. Letters Patent No. 2,254,259, granted September 2, 1941.

The member 10 has a body portion 15 which is integrally provided with a pair of opposed work engaging arms 16 and 17. These two arms, on their adjacent sides, are provided with hard work engaging surfaces 18 and 19 respectively, made of carboloy or other suitable material. These surfaces 18 and 19 are plane surfaces extending in diverging relationship with an included angle of about 45 to 60 degrees so as to contact circumferentially spaced portions of the cylindrical workpiece 11. As shown, these two surfaces 18 and 19 serve as the sole locating means for definitely positioning the surface of a cylindrical workpiece with respect to the gauging member, and more particularly with respect to the outer or gauging surface of a gauging nozzle 20.

Figure 3:
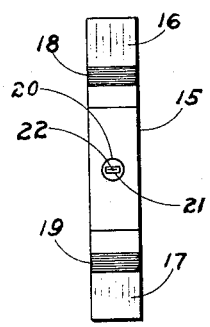
Fig. 3 is an end view of the gauging member.
Figure 4:
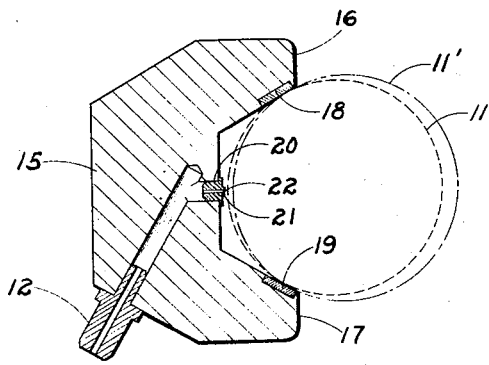
Fig. 4 is a central vertical section through the gauging member showing its relationship to a workpiece.

The nozzle 20 is arranged in the body portion 15 between the two work engaging surfaces 18 and 19 and is positioned so that its effective end 21 is slightly spaced away from the surface of a workpiece of the minimum acceptable diameter for which the gauge is intended. Workpieces having a slightly oversize diameter but within the acceptable tolerance range, will have a greater spacing from the effective end of the nozzle. As shown in Figs. 3 and 4, the nozzle has a central opening 22 which is elongated in the direction of the axis of the workpiece. The effective gauging end 21 is parallel to the workpiece surface and there is preferably a uniform distance between the opening in the nozzle and the outer side of the effective or gauging surface of the nozzle.

When the workpiece is in position, the air supplied to the measuring instrument is controlled as to pressure, and this air, flowing through tube 13, is discharged between the gauging end of the nozzle and the surface of the workpiece, and the spacing between these parts determines the rate at which leakage takes place. The measuring instrument will show, by observation of the level of its indicator or float, just what the rate of flow is when the workpiece is in place, and this can be compared by the rate of flow that takes place when a part of standard diameter is applied. If desired, the scale opposite the float can be calibrated by using a master of known size so that the exact diameter of the workpiece being gauged will be indicated with extreme accuracy.

Application of the gauging member to the workpiece is readily accomplished, since the gauging member can be conveniently held in the hand and moved about as desired. It may be applied to workpieces held in the hand or mounted in fixed position, and may be used in conjunction with workpieces during their machining or grinding without removing the work from the machine in which it is being formed. As the gauging member is entirely devoid of operating parts, it is extremely simple in construction and it is economically made. There is substantially no wear on the gauge, since the workpiece is applied to the locating surfaces 18 and 19 by movement of the workpiece or the gauging member in a direction transverse of the workpiece axis. Even a slight pressure applied to the body portion of the gauging member will firmly set the locating surfaces 18 and 19 with respect to the part being checked or measured.

As will be apparent from Fig. 4, workpieces that may vary in diameter to a considerable extent may be accommodated between the surfaces 18 and 19. Thus the circle 11' shows the diameter of a workpiece much larger than the maximum acceptable diameter, yet this workpiece is still receivable against the work locating surfaces of the gauging member although its surface will be spaced considerably from the gauging end of the nozzle and a comparatively large rate of flow of air through this orifice will be permitted. Diameters even much larger than the circle shown at 11' may contact the ends of the arms 16 and 17 and show, by a visual inspection, that they are much too large. In view of the fact that the diverging relation of the work locating surfaces permits of a very wide range of diameters, the gauging member is particularly useful in checking parts, either running or stationary, while the parts are being made in a machine. As the parts approach the intended diameter, a reading is produced on the flow measuring instrument 14, and when the proper diameter is obtained, the work surface will be very slightly spaced from but still very close to the end of the gauging nozzle.

While the form of apparatus herein described constitutes a preferred embodiment of the invention, it is to be understood that the invention is not limited to this precise form of apparatus, and that changes may be made therein without departing from the scope of the invention which is defined in the appended claim.

What is claimed is:

A gauging member of the character described adapted to be held in the hand of the user and having a flexible connection to a fluid supplying and measuring instrument and in which the various parts of said member are rigidly interconnected to one another so that the member as an entirety is devoid of moving parts, said member comprising a block having a body portion and a pair of opposed work engaging arms rigid therewith and extending therefrom in diverging relationship, the body portion of the block and the arms being of substantially uniform width in the direction of the work axis, said arms being provided, on their adjacent sides, with flat finished work engaging surfaces adapted to contact along lines parallel to the workpiece axis with circumferentially spaced portions of a cylindrical workpiece and definitely locate the cylindrical surface of the workpiece with respect to the block, said block having a fluid passage and the body portion of the block having a nozzle elongated in the direction of the work axis and of very restricted size in a plane transverse of said work axis and arranged between said work engaging surfaces and in communication with said passage, said nozzle having a freely exposed end located in fixed position slightly spaced from the located cylindrical surface of a workpiece of any diameter in the size range for which the body portion is adapted so that fluid flow from the gauging end of said nozzle is directly against the workpiece.

LOUIS F. POLK.

REFERENCES CITED

The following references are of record in the file of this patent:

UNITED STATES PATENTS

| Number | Name | Date |
|---|---|---|
| 1,401,119 | Aldeborgh | Dec. 27, 1921 |
| 2,001,447 | Balsiger | May 14, 1935 |
| 2,019,066 | Balsiger | Oct. 29, 1935 |
| 2,370,219 | Aller | Feb. 27, 1945 |
| 2,408,672 | Mennesson | Oct. 1, 1946 |

FOREIGN PATENTS

| Number | Country | Date |
|---|---|---|
| 374,107 | Germany | Apr. 19, 1923 |